Feb. 23, 1937.   R. J. SCHUYLER ET AL   2,071,661
APPARATUS FOR AND METHOD OF PREVENTING
UNAUTHORIZED REMOVAL OF VEHICLE TAGS
Filed Jan. 14, 1935

Robert J. Schuyler
John U. Shanklin
INVENTORS

BY Loyal J. Miller
ATTORNEY

Patented Feb. 23, 1937

2,071,661

UNITED STATES PATENT OFFICE 2,071,661

APPARATUS FOR AND METHOD OF PREVENTING UNAUTHORIZED REMOVAL OF VEHICLE TAGS

Robert J. Schuyler and John U. Shanklin, Lawton, Okla.

Application January 14, 1935, Serial No. 1,692

2 Claims. (Cl. 40—125)

Our invention relates to vehicle license tags and to means for preventing illegal or unauthorized removal, exchange, or use of such tags; and, also to means for designating when a vehicle license tag is being legally used.

The various States of the United States of America now have individual State tax laws governing the operation of motor driven vehicles and assessing a tax upon each. The various laws each require the purchase from the State of a numbered tag for each of such vehicles, and the prominent display of such tag upon the vehicle.

It has become a common practice among the lawless element to steal tags dispensed by the various States, and to use them upon vehicles which have either been themselves stolen or which are being operated for lawless purposes. This practice offers the criminal considerable protection in his intrastate as well as his interstate movement.

The prime object of the present invention is the prevention of the illegal use of vehicle State license tags, as well as the provision of a means whereby a somewhat frequent check may be kept upon all vehicles in order to ascertain if a tag is being illegally used.

The invention consists substantially of the provision of a seal bearing a numeral identical with the numeral carried by each tag, and the use of such seal for sealing the seal and the tag to the vehicle.

In cases where inadvertent violation of the law is made by persons, who upon investigation, can prove they are law abiding citizens, they could be given a period of time sufficient to permit them to obtain from the State, at a nominal figure, another tag and corresponding seal.

Other objects of the invention are to provide a device and method of the class described which is new, novel, practical and of utility; which is simple to put into operation and install; which is an aid in detecting unlawful use of a licensed tag; which is cheap to manufacture; which is strong and durable; and, which will be efficient in accomplishing all the purposes for which it is intended.

Figure 1:
Figure 2:
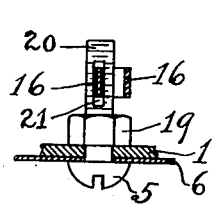
Figure 3:
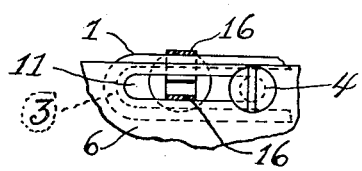
Figure 4:
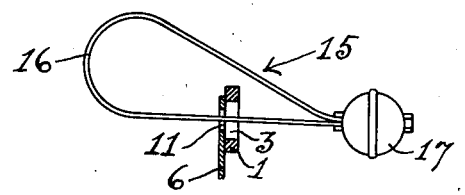

With these and other objects in view as will more fully appear hereinbelow, our invention consists in the construction, novel features, and combination of parts hereinafter more fully described, pointed out in the claims hereto appended, and illustrated in the accompanying one-sheet drawing, of which, Figure 1 is a front or face view of a vehicle license tag attached to a usual vehicle tag bracket, and showing the tag sealed to the bracket;

Figure 2 is a detail, partially in section, and showing one manner of utilizing the seal; and, Figures 3 and 4 are details showing a slightly different manner of sealing the tag to the bracket.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein:—

The reference numeral 1 indicates as a whole a usual tag supporting bracket which is as a rule welded to or otherwise made integral with the vehicle, and which usually is equipped with an illuminating element 2. The bracket is equipped with two or more spaced through slots or elongated perforations 3 adapted to receive bolts 4 and 5 for attaching a license tag 6 thereto. The tag is equipped with a suitable numeral 7 and also with indicia 8 and 9 for indicating the State issuing the tag and the year of issuance respectively. The tag has through slots 10 and 11 for receiving the bolts 4 and 5 respectively.

The seal for preventing removal of the tag from the bracket is indicated as a whole by the reference numeral 15, and consists substantially of a flexible metal strap 16 having a locking mechanism 17 permanently connected to one of its ends. The mechanism 17 is so designed that when the free end of the strap 16 is bent and slipped into the mechanism as illustrated in Fig. 4, it cannot be removed without destroying the mechanism. The seal 15 is of a design now used extensively by railroads for sealing freight car doors.

The seal is equipped with a numeral 18 corresponding to the numeral 7 carried by the tag 6.

In Fig. 2 is illustrated one means in which the seal is utilized in preventing removal of the tag from the bracket without the seal being broken. In this embodiment the bolt 5 is constructed of sufficient length to extend considerably past its nut 19, and this extending portion 20 is equipped with a through slot 21 sufficient in length to permit the insertion therethrough of the strap 16 of the seal 15. After the tag and the bracket have been bolted together in a usual manner by the bolts 4 and 5, the free end of the seal is inserted through the slot 21 in the bolt 5 and is then inserted into and locked within the locking mechanism 17.

If found desirable, both of the bolts 4 and 5 could be equipped with the slots 21 and one of the seals 15 could be used to seal each bolt in place. If this were done, both of the numerals 18 would, of course, be identical with the numeral 7. It might also be found desirable to insert a single seal 15 through both of the bolts 4 and 5.

In Figs. 3 and 4 is illustrated a slightly different use of the seal 15. In this instance the tag 6 is bolted to the bracket 1 in a usual manner by two of the bolts 4, and the strap 16 is inserted through one of the slots 3 in the bracket and through either the slot 10 or 11 in the tag 6. This method is somewhat cheaper to utilize than the former due to the fact that the expense of making the slots 21 in the bolts 5 may be eliminated.

From the foregoing description it is thought that operation of the invention may well be understood by a person familiar with the art, and that further description would be superfluous.

Obviously, the invention is susceptible of embodiment in forms other than that which is illustrated in the accompanying drawing and described herein, and applicable for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In a device of the class described the combination with a plate support permanently fixed to the vehicle and having a perforation therethrough, and with an identifying plate having a perforation therethrough and having a number thereon, of a bolt passing through the two perforations, said bolt having a transverse aperture and a nut on the bolt, a frangible identifying strip passing through the aperture and preventing removal of the nut and having a number thereon, both of said numbers being of identical configuration and so disposed as to be simultaneously visibly displayed, and a lock for locking the two ends of the strip together, and securely holding said plate support, plate and said strip together against removal without irreparable injury to said strip.

2. In a system of positively identifying motor vehicles, the combination with a license plate and a license plate bracket carried by a vehicle, of a bolt passing through both the license plate and the license plate bracket adapted normally to secure the two together, a transverse through aperture near the threaded end of said bolt, a nut on the bolt, a frangible strap seal passing through the aperture outside the bolt adapted to prevent removal of the bolt without removal of the seal; and a lock for locking the two free ends of said strap seal together; said strap seal being so marked as to positively identify the said license plate as being the one orginally fastened to the license plate bracket by said bolt.

ROBERT J. SCHUYLER.
JOHN U. SHANKLIN.